United States Patent [19]
Hirokawa

[11] Patent Number: 6,104,506
[45] Date of Patent: *Aug. 15, 2000

[54] FACSIMILE APPARATUS HAVING FUNCTION OF UPDATING INCORPORATED PROGRAM

[75] Inventor: Masashi Hirokawa, Kanagawa, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,959

[22] Filed: Jan. 29, 1997

[30] Foreign Application Priority Data

Feb. 5, 1996 [JP] Japan .................................. 8-042105

[51] Int. Cl.$^7$ .................................................. H04N 1/00
[52] U.S. Cl. .......................................... 358/444; 358/404
[58] Field of Search .................................. 358/404, 444, 358/426; 364/715.02; 382/232

[56] References Cited

U.S. PATENT DOCUMENTS

| | | | |
|---|---|---|---|
| 5,428,460 | 6/1995 | Kabeya et al. ........................ | 358/404 |
| 5,500,742 | 3/1996 | Kamijo ................................. | 358/444 |
| 5,537,218 | 7/1996 | Negi .................................... | 358/444 |
| 5,606,428 | 2/1997 | Hanselman ........................... | 358/444 |
| 5,673,392 | 9/1997 | Nakashima et al. ............... | 364/715.02 |
| 5,710,843 | 1/1998 | Tsukamoto et al. .................. | 358/444 |

FOREIGN PATENT DOCUMENTS 63-31367  6/1988  Japan .

*Primary Examiner*—Yon J. Couso
*Attorney, Agent, or Firm*—Cooper & Dunham LLP

[57] ABSTRACT

A programmable facsimile apparatus capable of updating a program incorporated therein. The apparatus includes a first memory for storing user updatable information, a compressed update program used for updating the user updatable information and a decompress program for decompressing the compressed update program. A second memory is also included. The compressed update program is decompressed by the decompress program and stored in the second memory and the user updatable information is updated by the decompressed update program stored in the second memory.

34 Claims, 5 Drawing Sheets

FACSIMILE APPARATUS HAVING FUNCTION OF UPDATING INCORPORATED PROGRAM

BACKGROUND OF THE INVENTION

1. Field of the Invention

The present invention relates to a facsimile apparatus including a function for updating a program incorporated therein. More particularly, the present invention relates to an update program for a facsimile apparatus. The facsimile apparatus has a compressed update program stored in the same memory in which programs to be updated are stored.

2. Description of the Related Art

In a typical facsimile apparatus, a program for controlling the operation thereof is stored in a rewritable non-volatile memory such as a flash memory. The facsimile apparatus may include a function of updating a stored program with a new program transmitted thereto from a remote facsimile apparatus or the like.

An example of a facsimile apparatus having the above-mentioned function is described in Japanese Laid-open Patent Application No. 63-31367 (1988). The facsimile apparatus receives a procedure program, which is transmitted thereto from a remote location, via a communications line. The procedure program is then stored in a rewritable non-volatile memory (such as EEPROM) together with a communications procedure program which has been previously stored therein. However, this update method has a disadvantage in that a program used exclusively for updating programs is incorporated in the apparatus taking up valuable memory space. Accordingly, additional expensive non-volatile memory storage capacity is required for storing the update program.

As is well known in the field of information processing apparatuses such as computers, programs to be executed by the information processing apparatus can be stored in a compressed state. The compressed program is then decompressed when it is used. For example, a personal computer uses a real time decompression technique in which programs are stored, for example, on a hard disk in compressed form. When the program is to be used, it is retrieved from the hard drive, decompressed and stored in RAM. The program is then executed from RAM. Since the compress/decompress technique requires less hard disk area for storing a program than when the same programs are stored in an uncompressed state, this technique has been used to reduce the amount of storage space required. However, this still requires a relatively large amount of RAM to store the programs being executed.

Many techniques have been proposed for reducing the required memory capacity in personal computers. Facsimile apparatuses on the other hand typically have smaller memory capacities and normally do not need to update programs incorporated therein. Therefore, facsimile apparatuses are typically not provided with automatic program update means. Accordingly, no effective method has been proposed for providing such a function in facsimile apparatuses.

OBJECTS AND SUMMARY OF THE INVENTION

The present invention has been made to solve the problems described above associated with updating programs in a conventional facsimile apparatus. It is an object of the present invention to provide a facsimile apparatus having a relatively small memory capacity which is capable of effectively updating programs stored therein, thus eliminating the need for increased memory capacity.

According to a first aspect of the present invention, there is provided a programmable facsimile apparatus capable of updating a program incorporated therein. The apparatus includes a first memory for storing user updatable information, a compressed update program used for updating the user updatable information, and a decompress program for decompressing the compressed update program. The apparatus also includes a second memory, wherein the compressed update program is decompressed by the decompress program and stored in the second memory, and the user updatable information is updated by the decompressed update program stored in the second memory.

In the facsimile apparatus configured according to the the present invention, since the program required for updating a program is stored in a compressed state, the required memory capacity can be significantly reduced. When a program is updated, the compressed update program stored in the first memory is decompressed and then stored in the second memory so that a program in the first memory can be updated by the decompressed update program.

BRIEF DESCRIPTION OF THE DRAWINGS

A more complete appreciation of the present invention and many of the attendant advantages thereof will become readily obtained as the same becomes better understood by reference to the following detailed description when considered in connection with the accompanying drawings, wherein.

DESCRIPTION OF THE PREFERRED EMBODIMENTS

Figure 1:
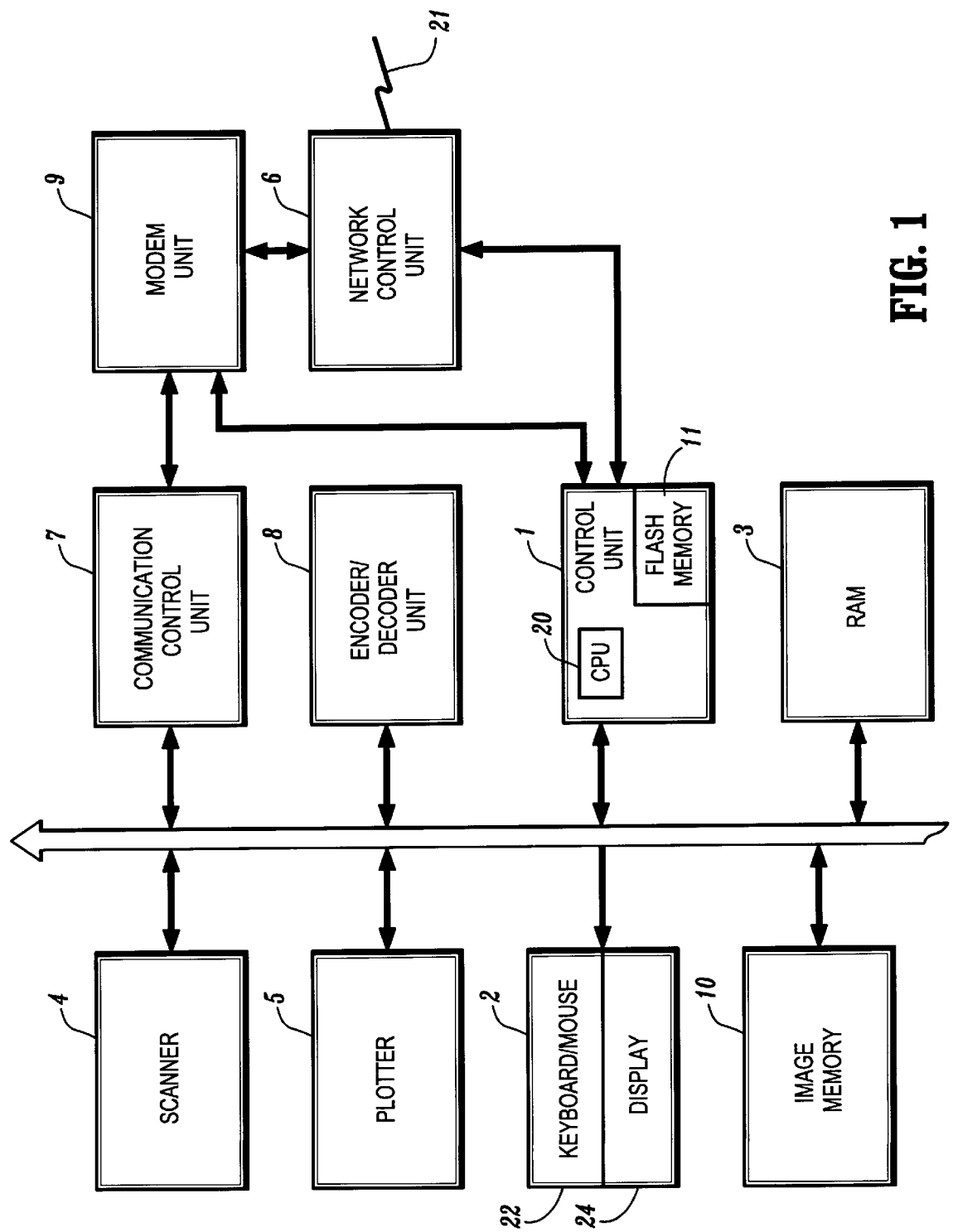
FIG. 1 is a block diagram illustrating the configuration of a facsimile apparatus according to an embodiment of the present invention.

The present invention will hereinafter be described in detail by reference to preferred embodiments thereof illustrated in the accompanying drawings. FIG. 1 is a block diagram illustrating an exemplary facsimile apparatus to which the present invention is applied. As shown in FIG. 1, the facsimile apparatus consists of control unit 1 for managing and controlling the facsimile apparatus in accordance with a built-in program. Control unit 1 includes a central processing unit 20 and a flash memory 11. Flash memory 11 is a rewritable non-volatile memory for storing, for example, programs for operating the facsimile apparatus. Operation/display unit 2 consists of a keyboard/mouse 22 which allows an operator to provide instructions to the facsimile apparatus and a display 24 for providing the operator with a message or the like from the facsimile apparatus. Random access memory (RAM) 3 temporarily stores image information or the like and scanner 4 reads an image from a document. Plotter 5 outputs received image information decoded by encoder/decoder unit 8 via RAM 3. Network control unit (NCU) 6 places a call to a remote facsimile apparatus via a public telephone network across communications line 21. Communications control unit 7 transmits and receives information in accordance with a G3 facsimile transmission control procedure. Modem unit 9 includes a low-speed modem and a high-speed modem. Image memory 10 accumulates and stores image information.

As shown in FIG. 2, according to an aspect of the present invention, flash memory 11 stores an original facsimile program, a compressed update program and a decompress program. The original facsimile program is used for operating the facsimile apparatus (hereinafter, the phrase original program refers to a program before update or a program to be updated). The compressed update program is used for updating programs stored in flash memory 11, as will be described in more detail below. The decompress program is used to decompress the compressed update program and to store the decompressed update program in RAM 3, as shown.

Figure 2A:
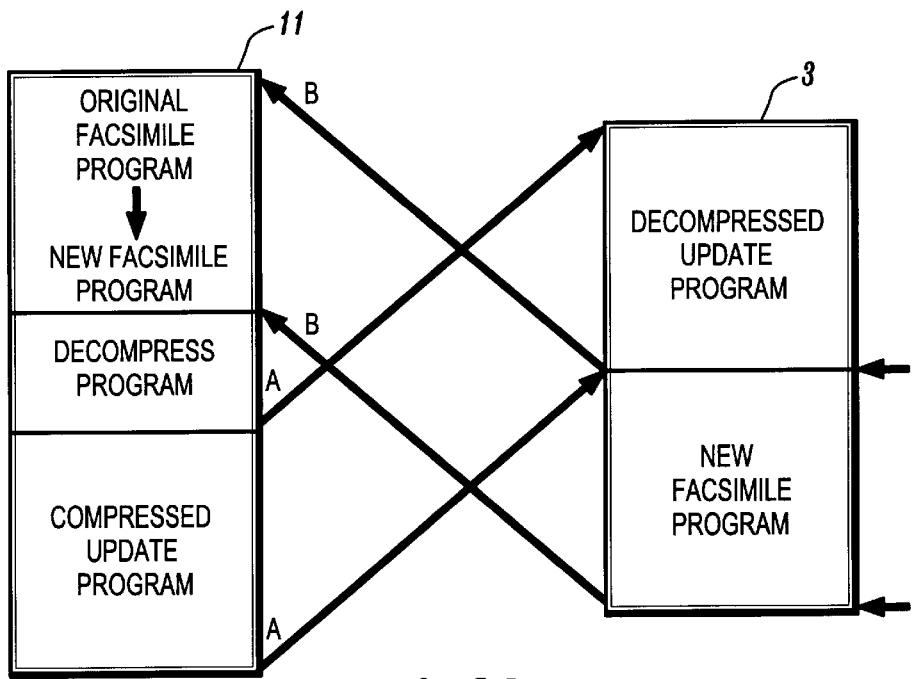
FIGS. 2A and 2B are explanatory diagrams for describing program update procedures according to aspects of the present invention.
Figure 2B:
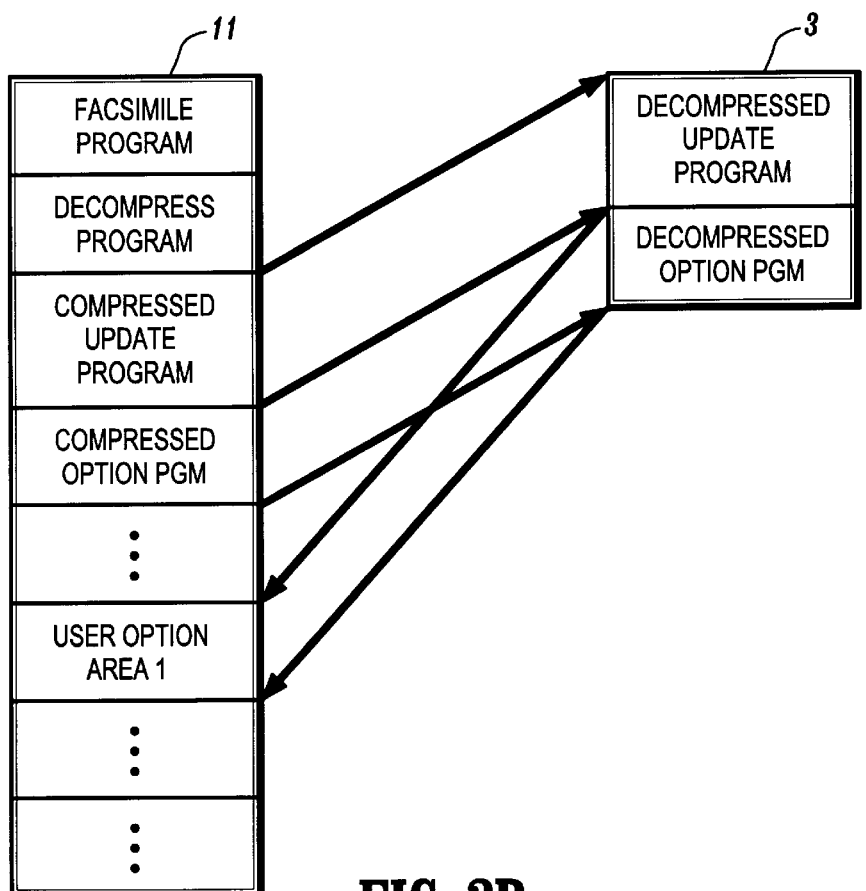
Figure 3:
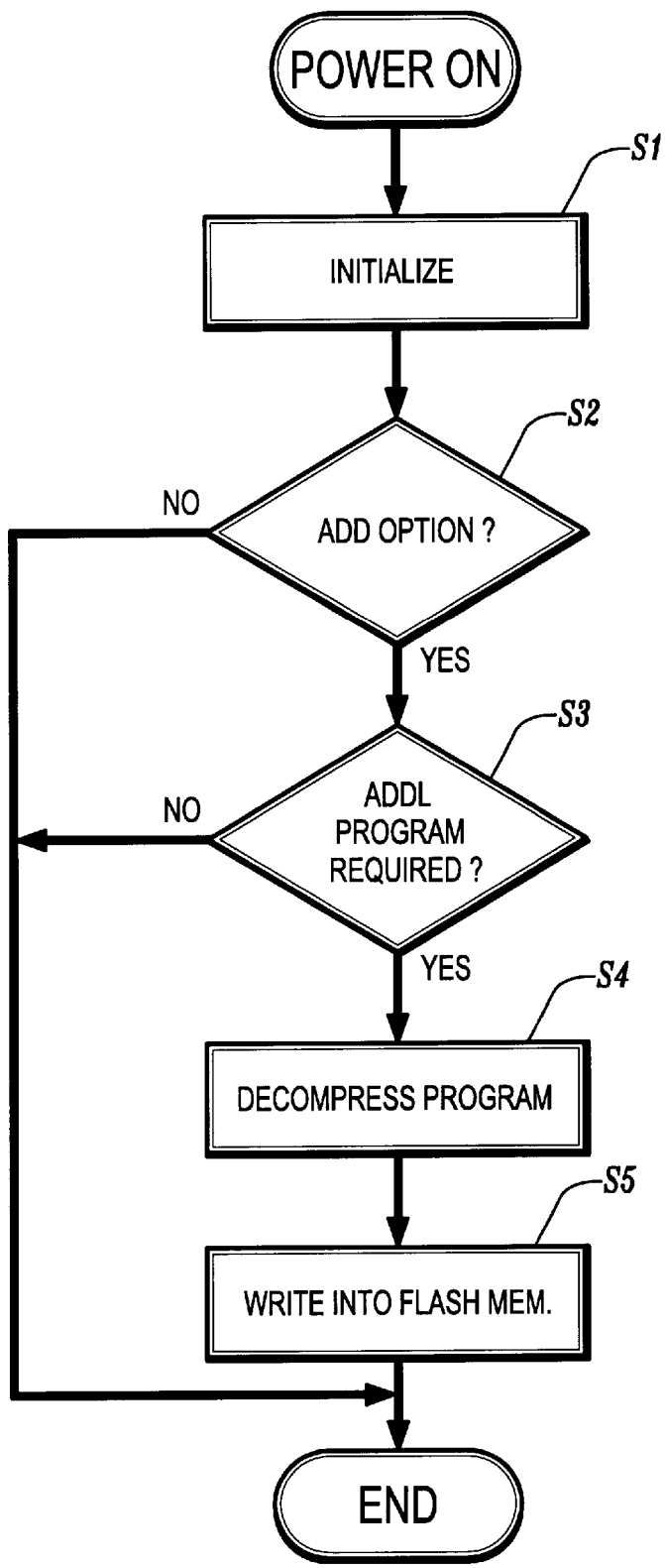
FIG. 3 is an operational flow chart illustrating a main sequence of operations performed by the facsimile apparatus according to an embodiment of the present invention.

FIG. 3 is an operational flow chart for explaining an exemplary control procedure performed according to the first embodiment of the present invention. The first embodiment of the present invention will be described below by reference to FIGS. 1–3. It should be noted that while the exemplary operational flow illustrated in FIG. 3 shows how a facsimile program is updated when a new optional function is added to the facsimile apparatus, the present invention is not limited to this particular example.

When the facsimile apparatus is powered on, initialization processing is executed by CPU 20 in control unit 1 in accordance with the original facsimile program stored in flash memory 11 (step S1). Initialization processing, for example, clears work areas of the various memories and sets a variety of data to their initial values. In a stand-by state after initialization, control unit 1 monitors operation/display unit 2 for an instruction to be inputted from a user, for example, to add an optional function to the facsimile apparatus (step S2). When the instruction is inputted (YES at step S2), the operational flow proceeds to step S3. If the addition of an optional function is not instructed or if another instruction is inputted in the stand-by state (NO at step S2), the operational flow (i.e., the program update flow) is terminated.

When the instruction to add an optional function is detected at step S2, the operational flow proceeds to step S3, where it is determined whether the addition of the optional function requires an additional program to be added to the facsimile apparatus (step S3). If an additional program is not required (NO at step S3), the operational flow is terminated. If it is determined that the optional function requires an additional program (YES at step S3), the compressed update program stored in flash memory 11 is decompressed and stored in RAM 3 (step S4).

More specifically, CPU 20 in control unit 1 sequentially reads the compressed update program from the top of a region in which the program is stored in flash memory 11, decompresses the read program according to a predetermined decompression rule, and sequentially stores the decompressed update program in a predetermined region of RAM 3 (indicated by arrows A in FIG. 2A).

When the compressed update program has been decompressed and stored in RAM 3, the decompressed update program is started, for example, by the decompress program in order to update the original facsimile program resident in flash memory 11 (step S5). More specifically, CPU 20 in control unit 1, in accordance with the decompressed update program stored in RAM 3, receives a new facsimile program (e.g., for example, from a remote facsimile apparatus (or a service center) or reads it from a floppy disk (which may be used in conjunction with image memory 10) via a floppy disk drive equipped in the facsimile apparatus. The new facsimile program is stored temporarily in RAM 3. Then, using the decompressed update program stored in RAM 3, the original facsimile program currently residing in flash memory 11 is overwritten with the new facsimile program temporarily stored in RAM 3 (indicated by arrows B in FIG. 2A). It should be noted that the new facsimile program can be in compressed or uncompressed form. If the new facsimile program is compressed, it is received by the facsimile apparatus, decompressed in 64K byte blocks, for example, and stored in RAM 3. The decompressed block is then written into flash memory 11, overwriting a portion of the original facsimile program. This procedure is repeated until the entire new facsimile program has been stored into flash memory 11. If the new facsimile program is not compressed, it is received by the facsimile apparatus and written directly into flash memory 11 or into RAM 3 and from there into flash memory 11. The system is then reset and the new facsimile program is started from its beginning.

In addition to being capable of updating the original facsimile program, various option programs can be added to the facsimile apparatus. For example, as shown in FIG. 2B options can be stored in flash memory 11 in compressed form. As upgrades are added to the facsimile apparatus, a service representative can control the apparatus to decompress compressed update program stored in flash memory 11 and store the update program in RAM 3. The update program is then used to read a compressed option program from flash memory 3, decompress it and store the decompressed option program in RAM 3. The decompressed option program can then be stored in user option area 1 of flash memory 11. In conjunction with a change to the facsimile program as described above, user options can thus be added to the facsimile apparatus. Of course, instead of storing the compressed options in flash memory 11, in order to save memory options can be input from an external source in either compressed or uncompressed form, as described above with respect to the facsimile program. In addition, an option program can be provided in a separate plug-in card in compressed or uncompressed form. The update program can then be used to transfer the option program to RAM 3 from the plug-in card and then to flash memory 11 as described above.

According to this embodiment of the present invention, the program required to update a program is normally stored in a compressed form, so that the non-volatile memory capacity necessary for storing the update program can be reduced.

Figure 4:
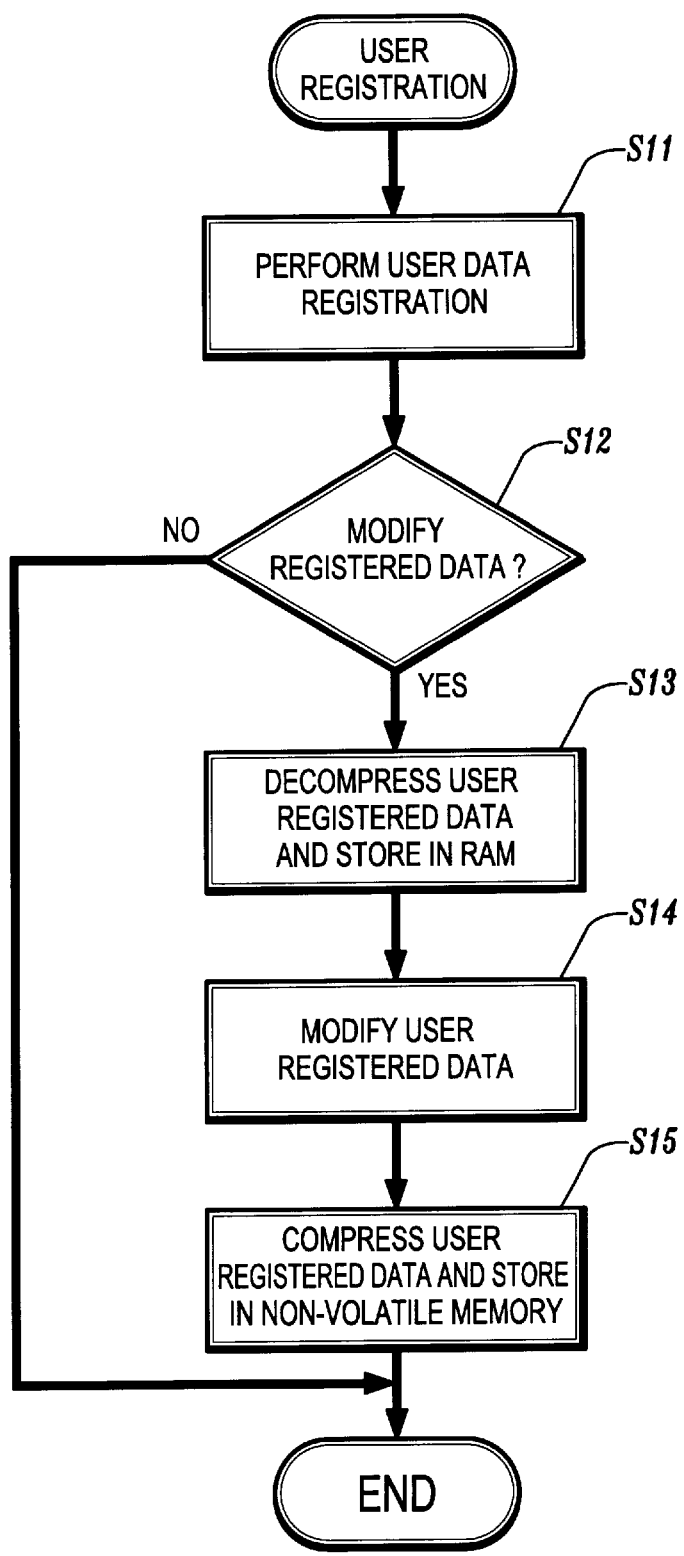
FIG. 4 is an operational flow chart illustrating a main sequence of operations performed by the facsimile apparatus according to an embodiment of the present invention.
Figure 5:
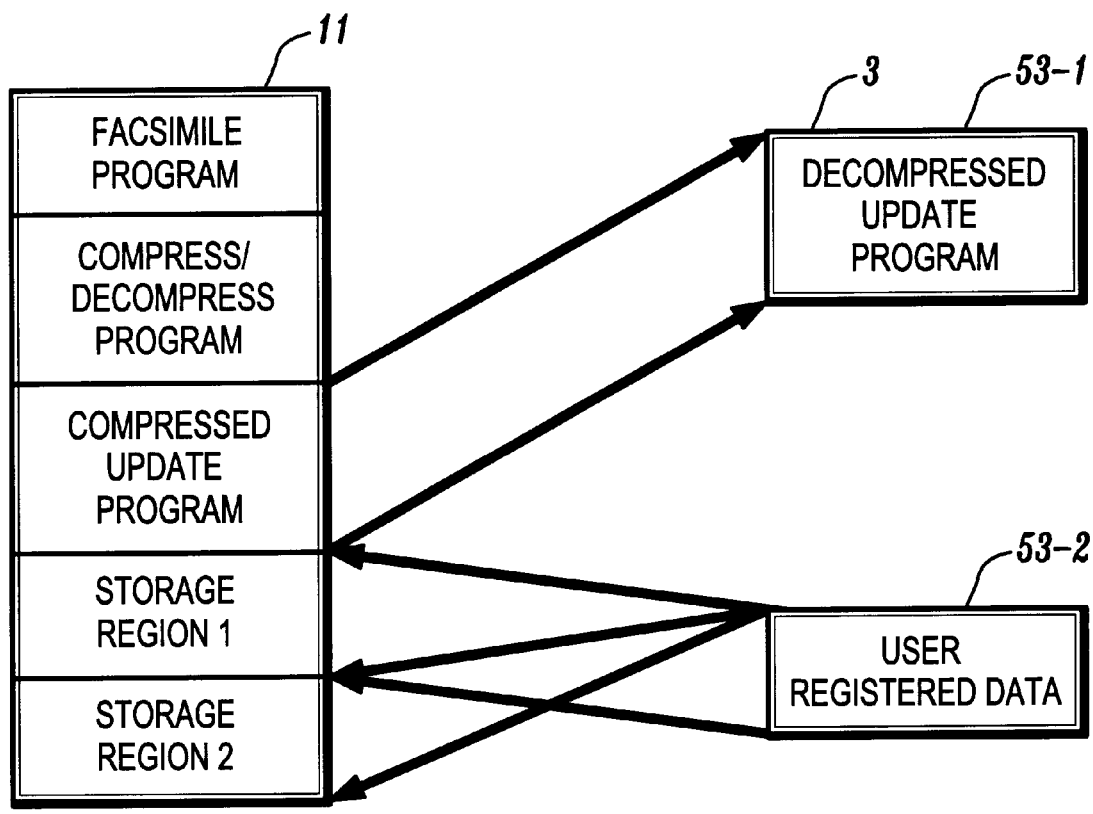
FIG. 5 is an explanatory diagram illustrating a program update procedure and a user registered data update procedure according to an embodiment of the present invention.

FIG. 4 is an operational flow chart representing a sequence of operations according to a second embodiment of the present invention. According to the second embodiment of the present invention, the flash memory 11 and RAM 3 of the facsimile apparatus are arranged as shown in FIG. 5. Flash memory 11 includes a facsimile program, a compressed update program and a first storage region 1 and a second storage region 2 for storing data registered by the user (hereinafter referred to as "user registered data"). Flash memory 11 also stores a compress/decompress program for decompressing programs and for compressing data and programs. Storage region 1 and storage region 2 store exactly the same user registered data. Since the same user registered data is stored in two storage regions of flash memory 11, normal operations can be conveniently maintained even if the user registered data stored in one of the storage regions is destroyed for any reason.

Operation of the second embodiment of the present invention will now be described by reference to FIGS. 4 and 5.

Referring to FIG. 4, a user first performs user data registration by inputting or registering user registered data 53-2 via the operation/display unit 2 (step S11). More specifically, when the user inputs data to be registered via keyboard/mouse 22, the data is first stored in a user registered data region 53-2 in RAM 3 (FIG. 5). The stored user registered data is then compressed by processing performed by CPU 20 in accordance with the compress/decompress program resident in flash memory 11. The compressed user registered data is then written into both storage region 1 and storage region 2 of flash memory 11, as indicated by arrows in FIG. 5 (step S11). The user registered data is thus maintained in compressed form in flash memory 11, requiring less memory than would otherwise be required if the data was stored uncompressed. Upon power up, or upon use of the user registered data, the data is read from flash memory 11, decompressed and stored in RAM 3.

In step S12, it is determined whether the stored user registered data is to be modified. If the user registered data is not being modified (NO at step S12), the operational flow is terminated. If the user registered data is being modified (YES at step S12), the compressed user registered data is read from either storage region 1 or storage region 2 of flash memory 11, decompressed, and stored in the user registered data region 53-2 of RAM 3 by the compress/decompress program (step S13).

When the update program is stored in flash memory 11 in a compressed state, as is the case of the example illustrated in FIG. 5, the compressed update program is also decompressed by the compress/decompress program and stored in region 53-1 of RAM 3 (indicated by arrows in FIG. 5).

Subsequently, using the update program now stored in RAM 3, the user registered data currently stored in RAM 3 (or a desired portion thereof) is displayed on the operation/display unit 2 (e.g., display 24) and updated by a user by movement of a cursor or the like via keyboard/mouse 22. In this way, the user registered data in RAM 3 can be updated. It should be noted that the update program may be stored in flash memory 11 in a decompressed state, in which case the update program need not be loaded into RAM 3. That is, the update program can be used directly from flash memory 11, to update the user registered data stored in RAM 3. However, this does not conserve memory as does storing the update program in compressed form.

After the user registered data has been modified (step S14), the modified user registered data is compressed and stored in storage region 1 and storage region 2 (step S15) of flash memory 11.

According to the second embodiment of the present invention, since the user registered data is stored in flash memory 11 in compressed form, the required capacity of the flash memory 11 can be reduced. In addition, the user registered data stored in a compressed form can be updated by the compress/decompress program and the update program.

While the second embodiment of the present invention has described an example in which the compress/decompress program and the update program (i.e., the program used for updating data) are stored in flash memory 11 as in the first embodiment, the present invention is not limited to this specific configuration. Alternatively, these programs may be stored in any other type of memory device (i.e., a ROM) for implementing the present invention.

As described above, according to the first embodiment of the present invention, a program required to update programs is stored in a compressed state in a rewritable non-volatile memory in which programs to be updated are stored. The compressed update program is decompressed and stored in RAM, and a program in the non-volatile memory is updated by the decompressed update program. Accordingly, it is possible to efficiently utilize the storage regions of the non-volatile memory without requiring further storage means such as ROM in addition to the non-volatile memory for storing the update program.

According to the second embodiment of the present invention, user registered data can be stored in a compressed state and decompressed and updated as required. This configuration is advantageous for storing updatable user registered data in a non-volatile memory while efficiently utilizing the storage regions of the non-volatile memory.

This invention may be conveniently implemented using a conventional general purpose digital computer programmed according to the teachings of the present specification, as will be apparent to those skilled in the computer art. Appropriate software coding can readily be prepared by programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present invention are possible in light of the above teachings. It is therefore to be understood that within the scope of the appended claims, the present invention may be practiced otherwise than as specifically described herein.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

What is claimed is:

1. A programmable facsimile apparatus capable of updating a program incorporated therein, said apparatus comprising:

a first memory for storing user updatable information, a compressed update control program used for controlling updating of the user updatable information stored in the first memory and a decompress program for decompressing the compressed update control program, the user updatable information stored in the first memory being selectively updatable by the user; and a second memory different than the first memory, for temporarily storing programs, wherein the compressed update control program is decompressed by the decompress program and stored in the second memory only when it is determined that the user updatable information stored in the first memory is to be updated, and update control is passed to the decompressed update control program stored in the second memory so that the user updatable information stored in the first memory is then updated using the decompressed update control program stored in the second memory and control of the apparatus is than passed back to a program stored in the first memory.

2. A facsimile apparatus as recited in claim 1, wherein the first memory comprises a non-volatile memory.

3. A facsimile apparatus as recited in claim 1, wherein the second memory comprises a volatile memory.

4. A facsimile apparatus as recited in claim 1, wherein the user updatable information comprises compressed user registered data, the compressed user registered data being decompressed by the decompress program stored in the first memory and stored in the second memory, the decompressed user registered data stored in the second memory being updated by the decompressed update program stored in the second memory.

5. A facsimile apparatus as recited in claim 4, wherein the first memory further stores a compress program, and wherein the updated user registered data stored in the second memory is compressed by the compress program and written into a user registered data region of the first memory.

6. A facsimile apparatus as recited in claim 5, wherein the updated user registered data is written into two user registered data regions of the first memory.

7. A facsimile apparatus as recited in claim 5, wherein the decompress program and the compress program comprise the same program.

8. A facsimile apparatus as recited in claim 1, wherein the user updatable information is a program for implementing an optional function of the facsimile apparatus.

9. A facsimile apparatus as recited in claim 1, wherein the first memory further stores an original facsimile program used for operating the facsimile apparatus.

10. A facsimile apparatus as recited in claim 9, wherein the decompressed update program is used to input and store a compressed new facsimile program into the facsimile apparatus in the second memory, and wherein the compressed facsimile program is then decompressed and stored in the first memory.

11. A facsimile apparatus as recited in claim 9, wherein the new facsimile program is stored into the first memory over the original facsimile program.

12. A method of updating a program incorporated in a facsimile apparatus, said method comprising steps of:

providing a first memory storing user updatable information, a compressed update control program used for controlling updating of the user updatable information stored in the first memory and a decompress program for decompressing the compressed update control program, the user updatable information stored in the first memory being selectively updatable by the user;

decompressing the compressed update control program using the decompress program only when it is determined that the user updatable information stored in the first memory is to be updated;

storing the decompressed update control program in a second memory different than the first memory and used for temporarily storing programs; and passing update control to the decompressed update control program stored in the second memory so that the user updatable information stored in the first memory can be updated using the decompressed update control program stored in the second memory.

13. A method as recited in claim 12, wherein the user updatable information comprises compressed user registered data, and wherein the updating step comprises steps of:

decompressing the user registered data;

storing the decompressed user registered data in the second memory;

updating the decompressed user registered data;

compressing the updated user registered data; and storing the compressed updated user registered data in the first memory.

14. A method as recited in claim 13, wherein the compressed updated user registered data is stored in the first memory in two areas.

15. A method as recited in claim 12, the updating step comprises steps of:

reading the user updatable information from the first memory;

storing the user updatable information in the second memory;

updating the user updatable information using the decompressed update program; and writing the updated user updatable information back into the first memory.

16. A method as recited in claim 12, wherein the user updatable information comprises an option program.

17. A method as recited in claim 16, wherein the option program is in compressed form, and wherein said updating step comprises steps of:

decompressing the option program and storing the decompressed option program in the second memory; and storing the decompressed option program in the first memory.

18. A method of updating a program incorporated in a facsimile apparatus, said method comprising steps of:

providing a first memory storing an original facsimile control program for controlling operation of the facsimile apparatus, a compressed update control program stored in the first memory used for controlling updating of the original facsimile control program and a decompress program for decompressing the compressed update control program stored in the first memory;

decompressing the compressed update control program using the decompress program only when it is determined that the original facsimile control program stored in the first memory is to be updated;

storing the decompressed update control program in a second memory different from the first memory and used for temporarily storing programs;

passing control to the decompressed update control program stored in the second memory so that a new facsimile control program can be loaded into the second memory using the decompressed update control program;

writing the new facsimile control program from the second memory into the first memory; and operating and controlling the facsimile apparatus utilizing the new facsimile control program stored in the first memory.

19. A method as recited in claim 18, wherein the loading step comprises steps of loading blocks of the new facsimile program into the second memory and the writing steps comprises steps of loading each block of the new facsimile program into the first memory.

20. A method as recited in claim 19, wherein the new facsimile program is in compressed form, and the step of writing comprises decompressing each block of the new facsimile program and writing it into the first memory.

21. A programmable facsimile apparatus capable of updating a program incorporated therein, said apparatus comprising:

first memory means storing user updatable information, a compressed update control program used for controlling updating of the user updatable information stored in first memory means and a decompress program for decompressing the compressed update control program, the user updatable information stored in the first memory means being selectively updatable by the user; and second memory means different than the first memory means, for temporarily storing programs, wherein the compressed update control program is decompressed by the decompress program and stored in the second memory means only when it is determined that the user updatable information stored in the first memory is to be updated, and update control is passed to the decompressed update control program stored in the second memory means so that the user updatable information stored in the first memory means is then updated using the decompressed update control program stored in the second memory means and control of the apparatus is than passed back to a program stored in the first memory means.

22. A facsimile apparatus as recited in claim 21, wherein the first memory means comprises a non-volatile memory.

23. A facsimile apparatus as recited in claim 21, wherein the second memory means comprises a volatile memory.

24. A facsimile apparatus as recited in claim 21, wherein the user updatable information comprises compressed user registered data, the compressed user registered data being decompressed by the decompress program stored in the first memory means and stored in the second memory means, the decompressed user registered data stored in the second memory means being updated by the decompressed update program stored in the second memory means.

25. A facsimile apparatus as recited in claim 24, wherein the first memory means further stores a compress program, and wherein the updated user registered data stored in the second memory means is compressed by the compress program and written into a user registered data region of the first memory means.

26. A facsimile apparatus as recited in claim 25, wherein the updated user registered data is written into two user registered data regions of the first memory means.

27. A facsimile apparatus as recited in claim 25, wherein the decompress program and the compress program comprise the same program.

28. A facsimile apparatus as recited in claim 21, wherein the user updatable information is a program for implementing an optional function of the facsimile apparatus.

29. A facsimile apparatus as recited in claim 21, wherein the first memory means further stores an original facsimile program used for operating the facsimile apparatus.

30. A facsimile apparatus as recited in claim 29, wherein the decompressed update program is used to input and store a compressed new facsimile program into the facsimile apparatus in the second memory means, and wherein the compressed facsimile program is then decompressed and stored in the first memory means.

31. A facsimile apparatus as recited in claim 29, wherein the new facsimile program is stored into the first memory means over the original facsimile program.

32. A programmable facsimile apparatus capable of updating a user updatable program incorporated therein, said apparatus comprising:

a first memory for storing a user updatable program, a compressed update control program used for controlling updating of the user updatable program stored in the first memory and a decompress program for decompressing the compressed update control program, the user updatable program stored in the first memory being selectively updatable by the user; and a second memory different than the first memory, for temporarily storing programs, wherein the compressed update control program is decompressed by the decompress program and stored in the second memory only when it is determined that the user updatable program stored in the first memory is to be updated, and update control is passed to the decompressed update control program stored in the second memory so that at least a portion of the user updatable program stored in the first memory is then updated with a new program using the decompressed update control program stored in the second memory and control of the apparatus is than passed back to a program stored in the first memory.

33. A programmable facsimile apparatus capable of updating compressed user registered data incorporated therein, said apparatus comprising:

a first memory for storing compressed user registered data, a compressed update control program used for controlling updating of the compressed user registered data stored in the first memory to generate updated user registered data and a decompress program for decompressing the compressed update control program and for decompressing the compressed user registered data, the user registered data stored in the first memory being selectively updatable by the user; and a second memory different than that first memory, for temporarily storing programs, wherein the compressed update control program is decompressed by the decompress program and stored in the second memory only when it is determined that the user registered data stored in the first memory is to be updated, and update control is passed to the decompressed update control program stored in the second memory so that the compressed user registered data stored in the first memory is then updated with the updated user registered data using the decompressed update control program stored in the second memory and control of the apparatus is than passed back to a program stored in the first memory.

34. A programmable facsimile apparatus capable of updating compressed user registered data incorporated therein, said apparatus comprising:

a first memory including a first user registered data region and a second user registered data region for storing the compressed user registered data, and including a data region for storing a compressed update control program for controlling updating of the compressed user registered data to generate updated user registered data stored in the first memory and a decompress program for decompressing the compressed update control program and for decompressing the compressed user registered data; and a second memory different than the first memory for temporarily storing programs and data, wherein the same user registered data is stored in the first user registered data region and the second user registered data region, the compressed update control program is decompressed by the decompress program and stored in the second memory only when it is determined that the user registered data stored in the first memory is to be updated, and update control is passed to the decompressed update control program stored in the second memory so that the compressed user registered data stored in the first memory is then updated with the updated user registered data using the decompressed update control program stored in the second memory update control is passed to the decompressed update control program stored in the second memory so that.

* * * * *